United States Patent

[11] 3,588,883

[72] Inventors James E. Webb, Administrator of the National Aeronautics and Space Administration with respect to an invention of Tage O. Anderson, Arcadia, Calif.; Jack J. Stiffler, Concord, Mass.

[21] Appl. No. 704,446
[22] Filed Feb. 9, 1968
[45] Patented June 28, 1971

[54] ENCODER/DECODER SYSTEM FOR A RAPIDLY SYNCHRONIZABLE BINARY CODE
10 Claims, 6 Drawing Figs.

[52] U.S. Cl. .......... 340/347DD, 178/69.5, 179/15BS
[51] Int. Cl. .......... H03k 13/00, G06f 5/00, H041 4/00
[50] Field of Search .......... 340/347, 167, 164; 343/100.7; 178/69.5; 179/15 (SYNC)

[56] References Cited
UNITED STATES PATENTS
3,141,930 7/1964 Krauss .......... 178/69.5
3,306,978 2/1967 Simmons et al. .......... 179/15(SYNC)
3,412,334 11/1968 Whitaker .......... 343/100(.7)
3,444,320 5/1969 Miyagi .......... 179/15(SYNC)

*Primary Examiner*—Maynard R. Wilbur
*Assistant Examiner*—Michael K. Wolensky
*Attorneys*—G. T. McCoy, J. H. Warden and D. E. Leslie

ABSTRACT: An encoder/decoder system is disclosed, designed to generate a binary code which is a function of the outputs of a plurality of bistable elements. The generated code is assumed to be transmitted to and received by a receiving unit, where a replica code is generated. To generate the replica code in phase with the received code, the outputs of each of a plurality of bistable elements are correlated during a different decision-making period with the received code. At the end of the period, based on the correlation results, a decision is reached which output of the element is to be used. After all the decision-making periods, the chosen outputs of all the elements, when supplied to a majority circuit, produce a replica code, in phase with the received code.

| LINE | OUTPUT LEVELS | | | | | | | | |
|---|---|---|---|---|---|---|---|---|---|
| a | -1 | 1 | -1 | 1 | -1 | 1 | -1 | 1 | |
| b | -1 | -1 | 1 | 1 | -1 | -1 | 1 | 1 | |
| c | -1 | -1 | -1 | -1 | 1 | 1 | 1 | 1 | |
| d | -3 | -1 | -1 | 1 | -1 | 1 | 1 | 3 | SUM |
| e | -1 | -1 | -1 | 1 | -1 | 1 | 1 | 1 | COMPOSITE CODE |

TAGE O. ANDERSON
JACK J. STIFFLER
INVENTORS

BY J. H. Warden
Harris & Coy
ATTORNEYS

TAGE O. ANDERSON
JACK J. STIFFLER
INVENTORS

BY J. H. Warden
G. T. McCoy

ATTORNEYS

TAGE O. ANDERSON
JACK J. STIFFLER
INVENTORS

BY J. H. Warden
[signature]
ATTORNEYS

TAGE O. ANDERSON
JACK J. STIFFLER
INVENTORS

BY

ATTORNEYS

ENCODER/DECODER SYSTEM FOR A RAPIDLY SYNCHRONIZABLE BINARY CODE

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention generally relates to coding circuitry and, more particularly, to a system consisting of an encoder for generating a binary code of a type which is rapidly synchronizable with a replica code, generated by a decoder which forms part of the invention.

2. Description of the Prior Art

In interplanetary ranging, range is measured in terms of transmission delay time. For an unambiguous measurement, the length of a code, used to determine transmission delay time, must exceed the transmission time. For interplanetary distances and high resolution, these ranging codes become exceedingly long, requiring a large number of correlations to acquire sync.

Briefly, in the prior art, maximum length shift register codes, often referred to as PN codes, are commonly used as ranging codes either individually or in combination. The detection of the delay between a transmitted and a received code requires that the code be received coherently. A local replica of the transmitter coder is synchronized with and phase-locked to the received code in a phase-lock loop. To acquire the received code, the locally generated code is correlated with the received code and the former is adjusted in phase until it is in sync with the received code. The number of phase adjustments which is required is generally related to the phase increments or bits in the code cycle; i.e., the code length.

The duration of each correlation or phase adjustment is dependent on the time constant of the correlator, which, in turn, depends on the noise environment. Since in interplanetary ranging the codes are very long and with increased noise the duration of each correlation is also quite long, the total time effort to acquire sync, representing the product of the number of correlations and the duration per correlation, is often longer than desirable or tolerable. Thus, a need exists for a system with which synchronization of a relatively long code can be acquired in less time; i.e., with a smaller total effort than herebefore realizable.

OBJECTS AND SUMMARY OF THE INVENTION

A primary object of the present invention is to provide a novel system for minimizing the total effort required to synchronize a maximal length code.

Another object of the invention is the provision of a system for generating a relatively long multibit binary code, and relatively simple means for producing a replica of the generated code in a minimum number of correlations.

A further object of the present invention is to provide a code generating and decoding system which is less complex than prior art systems and which is capable of providing sync with a smaller total effort.

Still a further object of the present invention is to provide a code generating and decoding system which is of simple design, employing state of the art circuits, but one which provides synchronization of long codes more efficiently and faster than any known prior art system.

These and other objects of the invention are achieved by providing an encoder to generate a binary composite code of bit length N, which is the majority function of the outputs of a string of $n$ interconnected bistable elements, such as flip-flops, where $N=2^n$. The majority function is produced by a majority circuit. In the string of flip-flops, the output of each is a square wave of a period which is a multiple of two of the output square wave period of a succeeding flip-flop.

The N bit composite code is assumed to be transmitted to and received ky a receiver which supplies it to a decoder which forms a major part of the invention. The decoder includes $n$ flip-flops, each associated with a switching network or device. Each flip-flop has a first output and a complementary second output. The decoder also includes a correlator unit and a timing and control unit, the latter defining $n$ decision-making periods, each of which is divided into first and second sampling intervals.

During each decision-making period the first and second outputs of a different flip-flop are supplied during the first and second intervals, respectively to a correlator, to which the received composite code is also input. The correlation results during the two intervals are compared, and at the end of the decision-making period a decision is made which one of the flip-flop's two outputs is to be used. The chosen output is used to drive a succeeding flip-flop and/or is supplied to a majority circuit. The latter, combines the outputs to produce a replica code.

After only $n$ decision-making periods, the outputs of all the $n$ flip-flops are chosen and supplied to the majority circuit which produces a replica code of the received composite code in phase, i.e., in sync therewith. The total effort when employing the encoder/decoder system of the present invention is decidedly less than the effort when employing prior art devices or techniques, and especially so, for longer codes and noisier conditions.

The novel features of the invention are set forth with particularity in the appended claims. The invention will best be understood from the following description when read in conjunction with the accompanying drawings.

DESCRIPTION OF THE PREFERRED EMBODIMENTS

Figures 1, 2, 3:
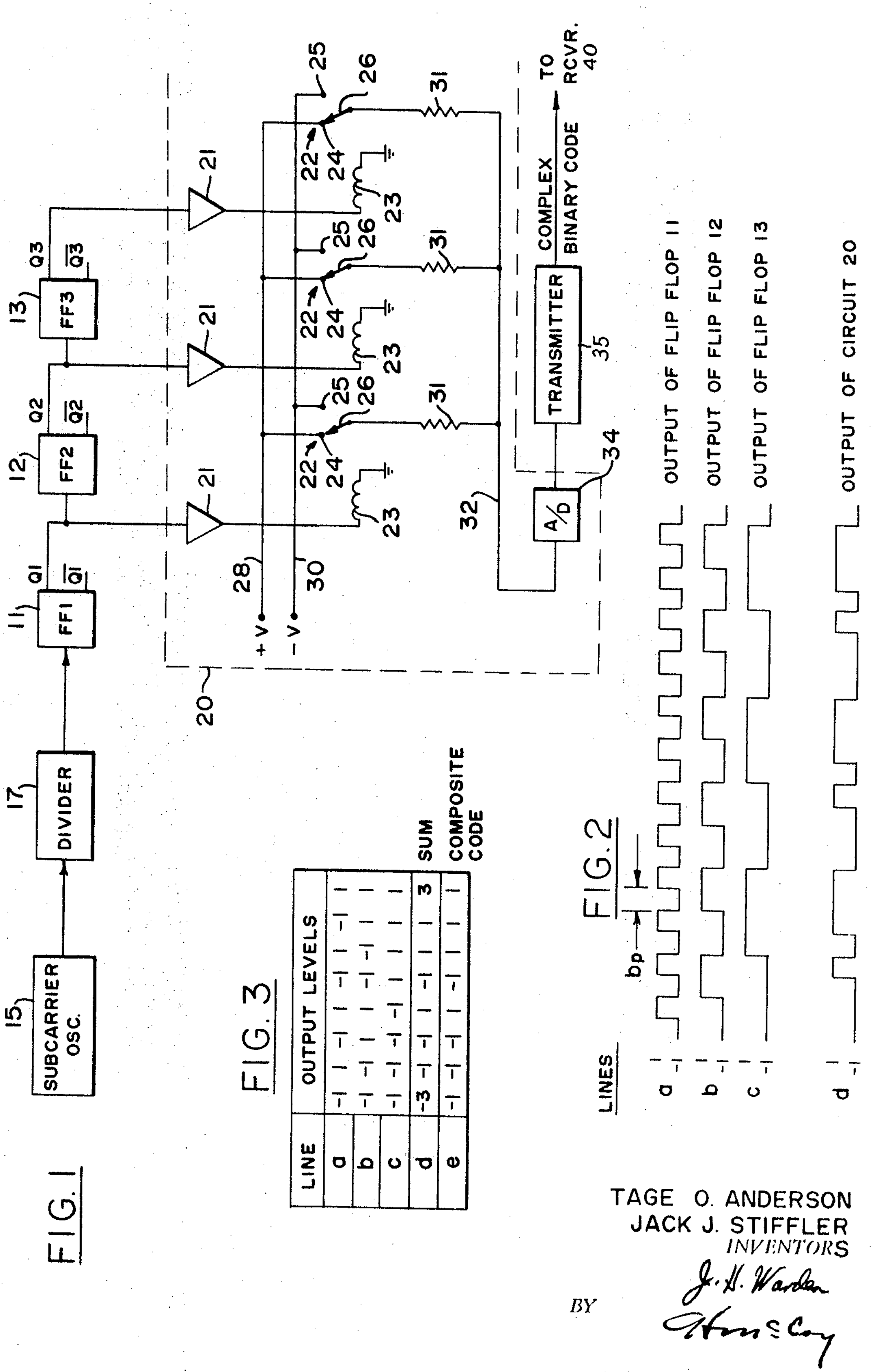
FIG. 1 is a simple block and schematic diagram of an exemplary embodiment of an encoder for generating a composite binary code.
FIGS. 2 and 3 are a multiline waveform diagram and a truth table, respectively, useful in explaining the embodiment shown in FIG. 1.

Attention is now directed to FIG. 1 wherein an encoder or code generator is shown including a string of flip-flops. For a composite code of length N where $N=2^n$, $n$ flip-flops are required. To simplify the following description, $n=3$ though in practice $n$ would be considerably greater than 3 ($n>>3$), in order to provide a code of sufficient length. In FIG. 1 the three flip-flops FF1, FF2 and FF3 are also designated by numerals 11, 12 and 13, with the Q output of one flip-flop serving as the input to the next or succeeding flip-flop. The input to flip-flop 11 (FF1) is connected to respond to signals from an oscillator, such as a subcarrier oscillator 15, which are frequency divided by a divider 17.

Assuming that the period of each signal which is applied to flip-flop 11 is bp, as shown in FIG. 2 the output of flip-flop 11 may be represented by the square wave in line $a$, where the upper level represents a 1 when the flip-flop is in a set state and the lower level represents a −1 when the flip-flop is in a reset state. The outputs of flip-flops 12 and !3 are represented by the square waveforms shown in lines $b$ and $c$, respectively.

Recognizing that these waveforms are mutually orthogonal, they may be summed vertically bit-by-bit to form a composite waveform or signal. FIG. 3 represents a truth table with the resultant or sum signal shown in line $d$. It is clear that such a sum signal is no longer binary. It can however be made binary by replacing each bit-sum by its sign. The resulting composite signal, hereafter referred to as the composite code, for the particular example of three flip-flops, is shown in line *e* of FIG. 3. Its waveform in terms of 1's and −1's is diagrammed in FIG. 2, line *d*.

Briefly, the composite code may be generated from the outputs of the flip-flops with a majority-type circuit, which produces a 1 output whenever a majority of the outputs of the flip-flops are 1's. On the other hand, a −1 output is provided by the majority-type circuit when a majority of the outputs of the flip-flops are −1's. One example of the implementation of such a circuit is diagrammed in FIG. 1, and is designated by numeral 20.

In the particular example, circuit 20 includes, for each flip-flop, an amplifier 21 and a relay 22, which consists of a coil 23, a pair of contacts or terminals 24 and 25 and a movable contact or blade 26. The use of relays as switching devices in the following description should be regarded as exemplary only. The relays are intended to represent any switching devices, including solid state circuits, which are capable of performing the switching functions of the relays which will be described hereafter in detail.

Terminals 24 are connected to a line 28 which is shown connected to a positive or plus potential +V with respect to a reference potential, such as ground, while a line 30 connects the terminals 25 to a negative potential −V. Each movable contact 26 is connected through a separate resistor 31 to a common line 32, which serves as the input line to a one bit analog-to-digital (A/D) converter 34, or other similar polarity sensing device.

For explanatory purposes let it be assumed that a 1 output of a flip-flop is amplified by its amplifier 21 to energize or activate the relay 22 so that the movable blade 26 is in contact with terminal 24 (as shown in FIG. 1). Consequently, the resistor 31 is connected to the plus potential +V. On the other hand, when the output of a flip-flop is a −1, the relay is not energized, i.e., in an OFF state and consequently the blade 26 is in contact with terminal 25 so that the resistor 31 is connected to the negative potential −V. Thus, the voltage at line 32 represents a voltage sum which is a function of the outputs of the flip-flops.

When at least two flip-flops have 1 output, the input to 34 is a positive voltage resulting in a 1 output therefrom. However, when the outputs of at least two of the flip-flops are −1, a negative voltage is applied to the D/A converter 34 to produce a −1 output. The output of the D/A converter 34 represents the composite code. For the particular phase relationships between the various flip-flops, diagrammed in lines *a*, *b* and *c* of FIG. 2, the composite code has a waveform or bit sequence as diagrammed in line *e*. This output, i.e., the composite code, is supplied to a transmitter 35 for transmission to a receiver 40 in a receiving unit, which is shown in FIG. 4 to which reference is made herein.

In the receiving unit, after the composite code is properly demodulated in receiver 40, by techniques well known in the art, the received composite code, hereafter also referred to as the received code, is supplied to a correlator unit 42. Unit 42 together with substantially all the other units and elements shown in FIG. 4 form a decoder 45, whose function is to produce a code which is a replica of the received code and in phase therewith. To produce such a replica code, the decoder 45 includes a string of three flip-flops FF1, FF2 and FF3, which are also designated by numerals 51, 52 and 53, respectively.

Each of the flip-flops has a single input and two outputs which are conventionally designated as Q and $\overline{Q}$. Hereafter it will be assumed that Q output is at a 1 level or is a 1 and the complementary $\overline{Q}$ output a −1 when the flip-flop is at a set state, while when being in the reset state, the Q and $\overline{Q}$ outputs are −1 and 1, respectively. The output waveforms of the three flip-flops in terms of binary levels 1 and −1 are diagrammed in lines *a* through *f* of FIG. 5.

Figure 4:
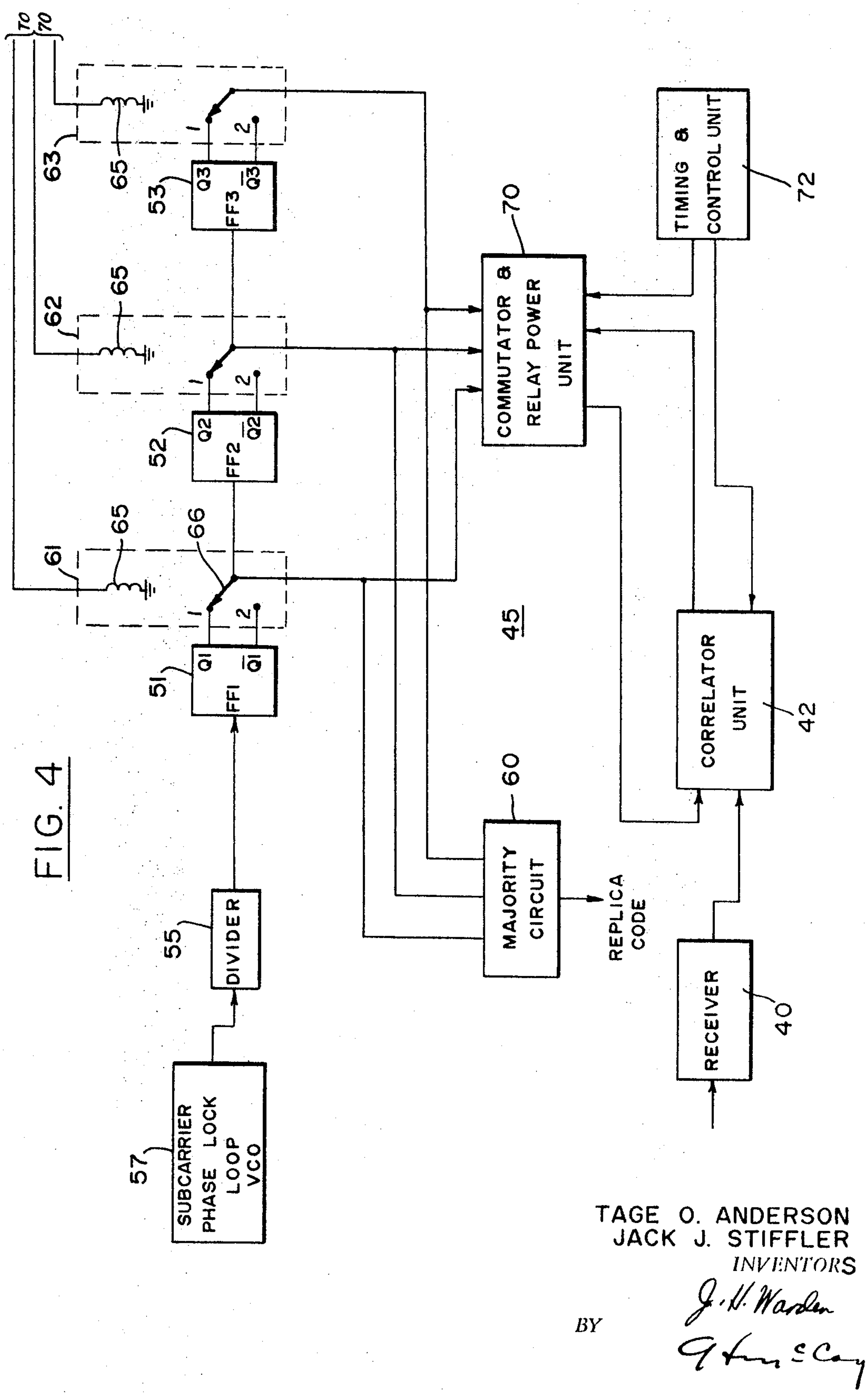
FIG. 4 is a block and schematic diagram of a decoder embodiment.

As seen from FIG. 4, the input to flip-flop 51 is connected through a frequency divider 55 from the output of a voltage control oscillator (VCO) 57. The latter is assumed to form part of a phase-lock loop which receives the subcarrier signals from the receiver to adjust the frequency and phase of the signals from the VCO 57 to be identical with the frequency and phase of the subcarrier signals. Since phase-locking techniques are well known in the art, and since neither the VCO 57 or the divider 55 contribute to the novelty of the invention, they will not be described in further detail. For the purposes of the present description it is sufficient to state that the signals which are supplied to the flip-flops 51 are of the same frequency and in phase with the subcarrier signals which are used in the encoder in the transmitting unit to form the received composite code, whose waveform is diagrammed in line *g* of FIG. 5.

If the outputs of flip-flops 51 and 52 were fixedly connected to the inputs of flip-flops 52 and 53, and the outputs of all three flip-flops were supplied to a majority circuit 60, which is identical with the majority circuit in FIG. 1, the output of circuit 60 would be a composite code, similar to the received code in length and bit period but probably not in phase therewith. To produce a replica code which is in phase, or in sync with the received code, in accordance with the present invention, a switching device is associated with each of the flip-flops. As will be explained hereafter in detail, each of these devices is used during a different decision-making period to supply the Q output of the flip-flop with which it is associated to the correlator unit 42 during one part of the decision-making period. During another part of the period the $\overline{Q}$ output is supplied to the correlator unit 42. Then, at the end of period based on a decision reached in unit 42, a signal is supplied to the switching device to control which of the two outputs of the flip-flop is to be used to drive the next flip-flop and/or as the input to the majority circuit 60.

For explanatory purposes, the three switching devices associated with the three flip-flops 51, 52 and 53 are represented by relays 61, 62 and 63 respectively. It should again be pointed out that electronic solid state switching devices may be preferred and, therefore, the relays should be regarded only as exemplary of required switching devices. Each relay is of a conventional type including a coil 65, and movable blade or contact 66 which is in contact with either a terminal 1 or a terminal 2, depending on whether or not power is applied to the relay coil. The terminals 1 and 2 are connected to the Q and $\overline{Q}$ outputs of the associated flip-flop.

The movable contacts 66 of the three relays are connected to the majority circuit 60, as well as to commutator and relay power unit 70. Contacts 66 of relays 61 and 62 are also connected to the inputs of flip-flops 52 and 53, respectively. The coils 65 of the three relays are connected by separate lines to unit 70, which together with the correlator unit 42 are controlled by a timing and control unit 72. The function of unit 72 is to define three successive decision-making periods, or simply decision periods hereafter designated D1, D2 and D3, as shown in line *h* of FIG. 5.

Each decision period such as D1 is divided into first and second equal-duration sampling periods, such as S1 and S2. During S1 of D1, units 70 and 42 are controlled to supply the Q1 output of flip-flop 51 to unit 42 and to correlate it with the received code. Then, during S2 of D1 the $\overline{Q1}$ output of 51 is correlated with the received code. At the end of S2, based on the accumulated correlation results during the two sampling periods, a decision is made which one of the outputs of flip-flop 51 should be used. Thereafter unit 72 controls the other two units to repeat the same decision-making process in succession for flip-flops 52 and 53.

Figure 6:
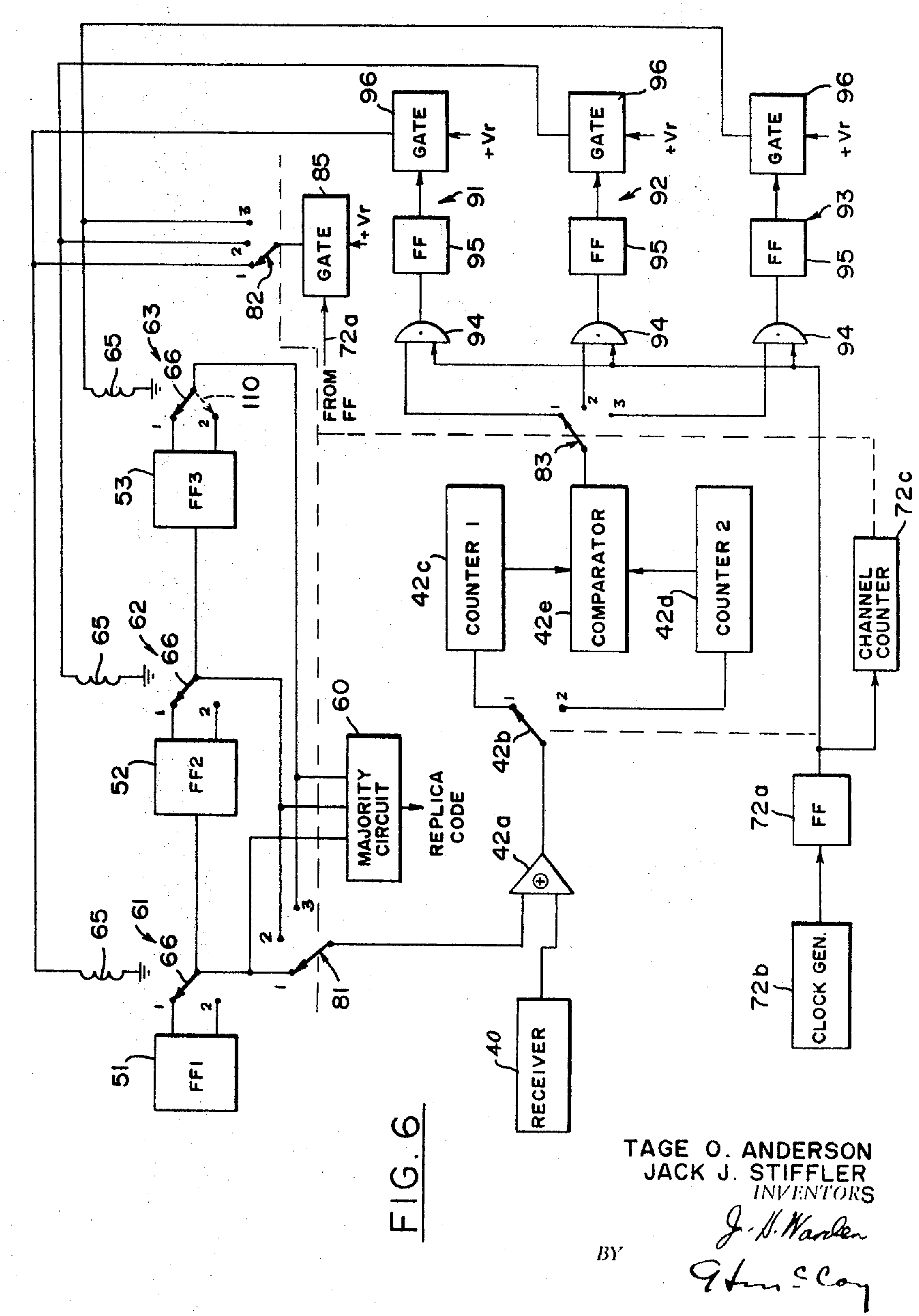
FIG. 6 is a more detailed diagram of the embodiment of FIG. 4.

For a complete explanation of the circuitry shown in FIG. 4, reference is now made to FIG. 6 wherein the units 42, 70 and 72 are shown in sufficient detail to enable one familiar with the art to practice the teachings disclosed herein. It should again be pointed out that the circuitry shown in FIG. 6 is exemplary of an arrangement which may be employed to determine the connections between a string of flip-flops in order to generate a composite code in circuit 60 which is a replica of and in sync with a received code.

In FIG. 6, the correlator unit 42 is shown including an Exclusive-OR gate 42*a* whose output is connected through a two-position switch 42*b* to either a counter 42*c* or a counter 52*d*. The two counters are connected to a comparator 42*e*. The gate 42*a* which serves as a correlator is supplied with the received code from receiver 40 as well as with one output from one of the flip-flops 51, 52 or 53 through a three-position switch 81, which is assumed to be ganged with the two three-position switches 82 and 83. The three switches serve as a commutator which is assumed to be part of unit 70 (FIG. 4).

In unit 70, switch 82 is connected to a relay power source designated $+V_R$ through a gate 85, while switch 83 selectively connects the output of comparator 42*e* to one of three identical circuits 91, 92 and 93. Each of the latter-mentioned circuits consists of an AND gate 94, whose output is supplied to a flip-flop 95 which controls a gate 96. When a gate 96 is open, which is assumed to occur when the flip-flop connected thereto is set by an enabling signal from the AND gate, relay power ($+V_R$) is applied to the relay coil to which the gate is connected. Consequently, the movable relay contact 66 is connected to the Q output of its associated flip-flop. On the other hand, in the absence of an enabling signal from an AND gate 94, the connected control flip-flop 95 remains in its reset state. Consequently, the associated gate 96 remains closed and the connected relay is not energized, in which case the moveable blade 66 is in contact with the Q output of the flip-flop.

The position of switch 42*b* and the condition of gate 85 are controlled by the output of a flip-flop 72*a* which, together with a clock generator 72*b* and a channel counter 72*c*, define the timing and control unit 72. The count in counter 72*c*, which for a string of three flip-flops is assumed to be a Mod 3 counter, controls switches 81, 82 and 83. The output waveform of flip-flop 72*a* is a diagrammed in line *h* of FIG. 5. One complete cycle of the waveform represents a decision period. During the first half of the cycle, i.e., sample period S1, the flip-flop 72*a* is set to provide a 1 output, and during the succeeding sample period S2, the flip-flop is reset to provide a −1 output. The change in state of flip-flop 72*a* is produced by the clock pulses from generator 72*b*.

All the decision periods (D1, etc.,) are of equal time length and the number of periods or decisions equals the number of flip-flops whose outputs are combined to form the replica code. The duration of each decision period depends on the noise conditions, the noisier the environment the longer the decision duration. In the prior art for a code $N=2^n$ bits, as many as $2^n$ correlations or decisions are performed, each possibly for a shorter time than required by the present invention. This number can be reduced from $2^n$ by combining shorter length PN codes. Nevertheless, the number of correlation is always considerably larger than *n*, the number needed here. In any event, in the decoder of the present invention, the total effort, defined as the product of the number of decisions and the time or period of each decision, is substantially shorter or smaller than the total effort required by any of the prior art methods. Consequently, faster synchronization is achieved with the present invention for equal length codes.

Figure 5:
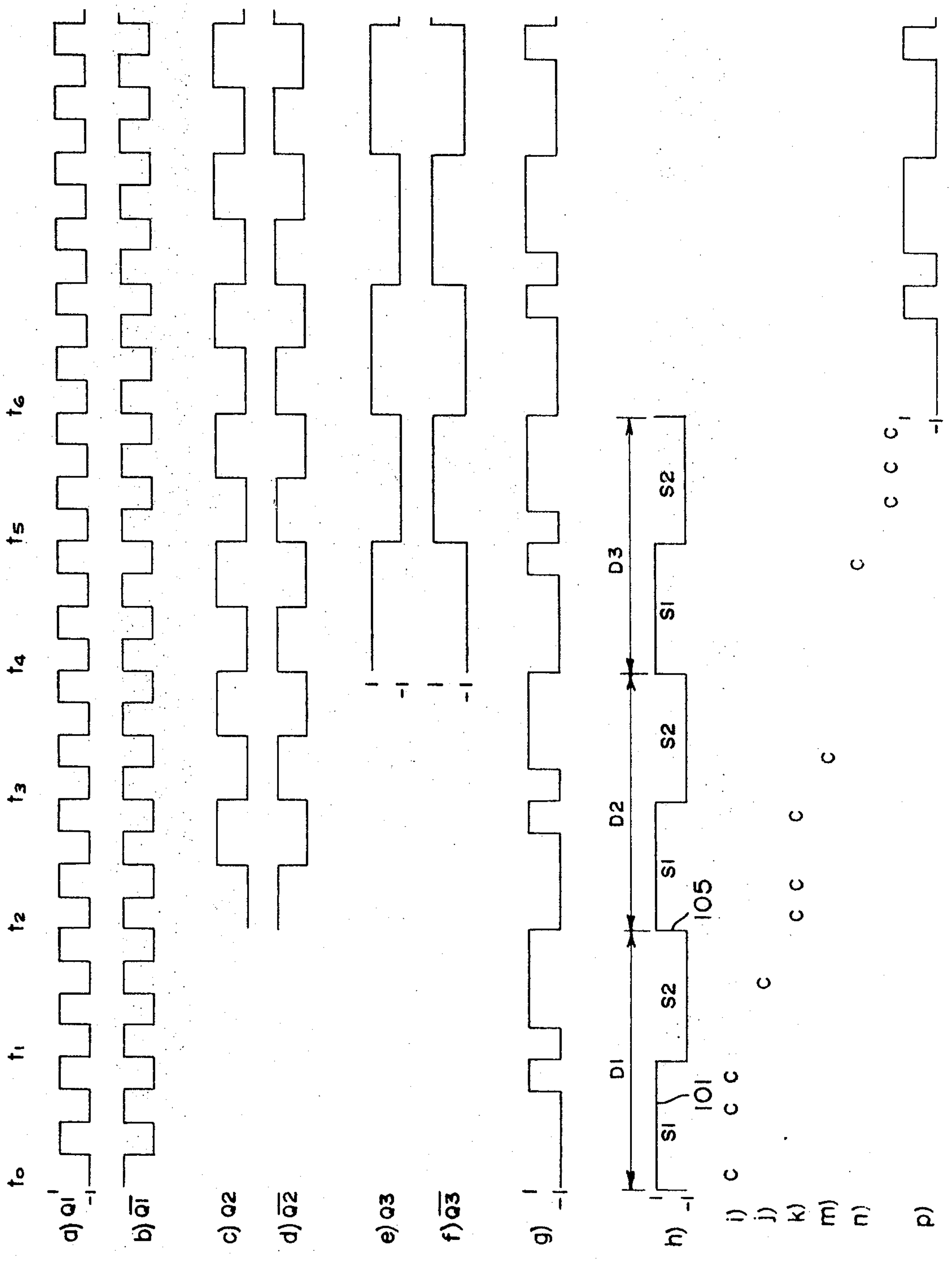
FIG. 5 is a multiline waveform diagram, useful in explaining the embodiment shown in FIG. 4.

The operation of the circuitry of FIG. 6 may best be explained and summarized with a specific example represented by the waveforms in FIG. 5. Let it be assumed that for a string of three flip-flops which produces a composite code of 8 bits in length, the noise environment is such that a decision duration, 8 bits long, is sufficient. Let it further be assumed that from a time $t_o$ the waveforms of the outputs Q1 and $\overline{Q1}$ of flip-flop 51 and the received code are as shown in lines *a*, *b* and *g* of FIG. 5. Prior to $t_o$ all the flip-flops except 51, 52 and 53, the gates and counters are in a reset state and the count in the counters is zero.

At $t_o$ a clock pulse from generator 72*b* drives the flip-flop 72*a* to a set state as represented by 101 in line *h* of FIG. 5. This is the start of D1. The change in the output of 72*a* from −1 to 1 advances the count in counter 72*c* to one (1) so that the switches 81, 82 and 83 are switched to their 1 positions. Also, the 1 level of 72*a* switches switch 83 to the 1 position and enables gate 85. Consequently, power ($+V_R$) is applied to the coil 65 of relay 61 thereby supplying the Q1 output to correlator 42*a*. From $t_o$ to a time $t_1$ the decoder is in sample period S1 of D1, during which the Q1 output (line *a*) and the received code (line *g*) are correlated, and the results accumulated in counter 42*c*. By comparing lines *a* and *g* between $t_o$ and $t_1$, it is seen that three out of the four bit correlate, as indicated in line *i* by the letters C. Thus, at time $t_1$ the count in counter 52*c* is 3.

At time $t_1$the flip-flop 72*a* switches to its reset state in which its output is a −1 which defines the sample period S2 of D1. When the output of 72*a* is −1 gate 85 is closed. Consequently, relay 61 is disabled, the $\overline{Q1}$ output is supplied to correlator 52*a* and the correlation results are stored in counter 42*d*. From lines *b* and *g* of FIG. 5 it is apparent that during S2 of D1 only one bit in the two waveforms correlates. Thus, at the end of D1 at time $t_2$, the counts in counters 42*c* and 42*d* are 3 and 1 respectively. Comparator 42*e* is assumed to provide an enabling output signal only when the count in 42*c* is greater than the count in 42*d*.

At time $t_2$ the flip-flop 72*a* is set for a second time to define the beginning of S1 of D2. The change from −1 to 1 in the output of flip-flop 72*a*, represented in FIG. 5 by line 105, increments the count in counter 72*c* to two which in turn turns switches 81, 82 and 83 to positions 2.

However, just before switch 83 is switched to position the change from −1 to 1 of the output of 72 *a* enables gate 94 of 91 to respond to the output of comparator 42*e*. Since the latter circuit provides an enabling output (counter 42*c* > counter 42*d*) gate 94 sets flip-flop 95 of 91 which in turn enables gate 96 to supply relay power $+V_R$ to relay 61. Thus, after $t_2$ which represents the end of decision period D1, relay 61 remains energized so that thereafter only the Q1 output of 51 is used.

The change in the output of 72*a* at $t_2$ represents the beginning of the sample period S1 of D2, during which the output Q2 is correlated with the received code until time $t_3$ when S2 of D2 starts. The end of the decision period D2 occurs at $t_4$. Intervals $t_5-t_4$ and $t_6-t_5$ represent S1 and S2 respectively of D3.

From a comparison of the waveforms in lines *c* and *g*, during S1 of D2 and in lines *d* and *g*, during S2 of D2, it is apparent that at the end of D2 the counts in counters 42*c* and 42*d* are 3 and 1 respectively. Thus, the comparator enables gate 94 of circuit 92, to finally enable gate 96 of 92. As a result, relay 62 is enabled so that, thereafter, only the Q2 output of flip-flop 52 is used.

However, by comparing the waveforms in lines *e*, *f* and *g* during D3 it should be apparent that at the end of D3 the counts in counters 42*c* and 42*d* are 1 and 3, respectively. Thus, the comparator does not provide an enabling signal to gate 94 of circuit 93. Consequently, gate 96 remains closed and relay 63 remains deenergized and, therefore, the moveable contact 66 of relay 63 remains in contact with the $\overline{Q3}$ output of flip-flop 53, as indicated in FIG. 6 by dashed line 110.

The end of decision period D3 represents the end of the decision-making process. In the particular example, relays 61 and 62 remain in their energized state, thereby supplying outputs Q1 and Q2 to the majority circuit 60. Relay 63 remains in the deenergized or OFF state so that the $\overline{Q3}$ output is supplied to circuit 60, which thereafter combines the three outputs to produce the replica code, diagrammed in FIG. 5, line *p*. That the replica code is in the phase, as diagrammed, becomes apparent by observing the phases of the waveforms in lines *a*, *c* and *f* which represent outputs Q1, Q2 and $\overline{Q3}$. It is clear from FIG. 5, lines *g* and *p*, that the replica code (line *p*) is in phase, i.e., in sync with the received code (line *g*).

Summarizing the foregoing description, the present invention consists of an encoder which is used to produce binary sequence or composite code of $N=2^n$ bits by combining the outputs of a string of *n* flip-flops, with the output of one flip-flop being the input to the next. The period of each pulse or signal supplied to the first period is equal to the desired bit period. Such an encoder with an exemplary majority circuit are shown in FIG. 1 and described in conjunction with FIGS. 2 and 3.

The invention further includes a decoder to which the composite code is supplied. The function of the decoder is to produce a replica code which is in sync with the composite code with a minimum number of decisions. The decoder includes a string of $n$ flip-flops each with two outputs, one being the complement of the other, such as Q and Q. Each flip-flop is associated with a switching device. The decoder also includes a correlator, a commutator and a timing and control unit. The function of the latter is to define a decision period for each flip-flop. During the first half of the decision period one output of the flip-flop, such as Q1, is correlated with the received composite code and during the second half, the complementary flip-flop output, such as $\overline{Q1}$, is correlated. Then, depending on which output exhibited a higher degree of correlation, a decision is reached which output is to be used as the input to a succeeding flip-flop and/or as the input to a majority circuit.

Thus, after only $n$ decisions the desired connections between the flip-flops and the majority circuit are determined, to result in the production of a replica code which is in sync with the received composite code.

As previously pointed out each decision period in the present invention may be longer than the decision periods required by prior art methods. However, because of the number of decisions, which in the decoder of the present invention is reduced to $n$, as compared to $2^n$ in the prior art, the total effort, as herebefore defined, is much smaller when the present invention is employed. It should again be pointed out that the various switching devices herebefore described are exemplary of the type of devices of which the encoder and decoder consist. Any of the mechanical or electromechanical devices, such as the relays and switches, may preferably be replaced by solid state electronically-operated devices, which are capable of performing equivalent functions. It should further be desired a separate correlator unit may be associated with each flip-flop of the decoder. With such an arrangement the desired outputs of the flip-flops may be chosen simultaneously in a single decision-making period. However, the reduction of the time required to obtain sync, must be weighted against the increased cost of providing a separate correlation unit for each element.

Although particular embodiments of the invention have been described and illustrated herein, it is recognized that modifications and variations may readily occur to those skilled in the art and consequently it is intended that the claims be interpreted to cover such modifications and equivalents.

We claim:

1. A decoder in which a binary composite code of N increments is received for providing a replica code which is in phase with the received composite code, said decoder comprising:

- $n$ binary elements arranged in a serial sequence, each element having a single input and first and second outputs, $n$ being equal to $\log_2 N$;
- a separate output selecting means connected to each for selectively connecting one of the element's output to the input of a succeeding element in said sequence;
- time-defining means for defining a separate decision-making period for each element, each period having a first part and a succeeding second part;
- correlation means responsive to periods defined by said time-defining means for correlating during the first part of each period the first output of the element associated with that period with said received composite code and for correlating during the second part of each period the second output of the element associated with that period with said received composite code;
- control means coupled to said correlation means and responsive to the correlations performed therein for activating at the end of each period the output selecting means connected to the elements associated with that period, to select one of the element's outputs as a function of the correlations performed by said correlation means during said period; and
- code-generating means coupled to said output selecting means for providing an output as a function of the selected outputs of said $n$ elements.

2. The decoder as recited in claim 1 wherein said code-generating means is a majority circuit providing a binary output as a function of the binary outputs of a majority of said $n$ elements.

3. The decoder as recited in claim 2 wherein said means for selecting include a first counter for storing the correlation results of the first output of an element with said composite code and a second counter for storing the correlation results of the second output of an element with said composite code and comparing means responsive to the contents in said first and second counters for selecting the output of said element at the end of the decision-making period as a function of the relative contents of said first and second counters.

4. A decoder for producing a replica code in phase with a received binary composite code of N bits, where $N=2^n$ the outputs of a string of $n$, serially connected, bistable elements, the decoder comprising:

- $n$ bistable elements arranged in a serial sequence, each having a first output and a complementary second output;
- timing means for defining a sequence of $n$ decision-making periods;
- first means connected and responsive to said timing means and including means for correlating during different portions of the $i^{th}$ decision-making period each of the outputs of the $i^{th}$ bistable element in said sequence to select the output to be used, $i$ varying from 1 to $n$;
- second means responsive to said first means for connecting the selected output of each element to a succeeding element in said sequence; and
- code-generating means coupled to the selected outputs of said $n$ elements for providing a replica code which is in phase with said received binary code.

5. The decoder as recited in claim 4 wherein said second means includes a first counter for storing the results of the correlations between said received composite code and the first output of said $i^{th}$ element; and

- a second counter for storing the results of the correlations between said received composite code and the second output of said $i^{th}$ element, and comparing means for comparing the correlation results, stored in said first and second counters to provide a signal to said first and second counters to provide a signal to said second means to select the output of said $i^{th}$ element which exhibits the higher degree of correlation with said received composite code.

6. The decoder as recited in claim 5 wherein said first means includes a commutator for selectively connecting during each decision-making period the outputs of a different element to said means for correlating, and a switching device switchable between first and second positions associated with each element.

7. An encoder/decoder system for providing a binary composite code of N increments and for generating a replica code in phase with said composite code, the system comprising:

- an encoder including $n$ serially connected bistable elements, $n$ being equal to $\log_2 N$, with the output of one element connected to the input of a succeeding element in the series of elements, and a majority circuit responsive to the outputs of said $n$ elements to provide a binary composite code as a function of the outputs of a majority of said $n$ elements; and
- a decoder including a group of $n$ bistable elements each having a first output and a complementary second output, timing means defining $n$ decision-making periods, first means responsive to the periods defined by said timing means for successively correlating during each period the outputs of a different element with said composite code, second means responsive to the correlations of said first means for selecting either the first output or the second output of the element as a function of the correlation results, and code-generating means connected to the selected outputs of said elements and responsive thereto for generating said replica code in phase with said composite code.

8. The system as recited in claim 7 wherein the output of each bistable element in said encoder is a square wave of a period which is a multiple of two of the period of the output of a succeeding element, each output being at either a first binary level or a second binary level, and the composite code is at said first and second levels when the outputs of a majority of said elements are at said first and second levels, respectively.

9. The system as recited in claim 7 wherein said means for successively correlating in said decoder include a first counter for storing the results of the correlation between said composite code and the first output of an element during a first part of a decision-making period, associated with said element, and a second counter for storing the results of the correlation between said composite code and the second output of said element during a second part of said decision-making period, and means for selecting the output of said element as a function of the contents of said first and second counters.

10. The system as recited in claim 9 wherein the output of each bistable element in said encoder is a square wave of a period which is a multiple of two of the period of the output of a succeeding element, each output being at either a first binary level or a second binary level, and the composite code is at said first and second levels when the outputs of a majority of said elements are at said first and second levels, respectively.